United States Patent
Hou et al.

(10) Patent No.: US 9,982,947 B2
(45) Date of Patent: May 29, 2018

(54) ROTARY KILN FOR REDUCING PHOSPHATE ORE IN KILN PHOSPHORIC ACID PROCESS AND METHOD FOR SOLVING RING FORMING IN KILN TAIL IN KILN PHOSPHORIC ACID PROCESS

(71) Applicant: SICHUAN KO CHANG TECHNOLOGY CO., LTD, Chengdu (CN)

(72) Inventors: Yonghe Hou, Chengdu (CN); Shifa Wei, Chengdu (CN); Pengsheng Wang, Chengdu (CN); Jiabin Wang, Chengdu (CN)

(73) Assignee: SICHUAN KO CHANG TECHNOLOGY CO., LTD., Chengdu (CN)

( * ) Notice: Subject to any disclaimer, the term of this patent is extended or adjusted under 35 U.S.C. 154(b) by 116 days.

(21) Appl. No.: 14/958,839

(22) Filed: Dec. 3, 2015

(65) Prior Publication Data

US 2016/0153717 A1    Jun. 2, 2016

Related U.S. Application Data

(63) Continuation-in-part of application No. PCT/CN2013/081164, filed on Aug. 9, 2013.

(30) Foreign Application Priority Data

Jun. 4, 2013  (CN) .......................... 2013 1 0218599

(51) Int. Cl.
*F27D 25/00*    (2010.01)
*F27B 7/04*    (2006.01)
(Continued)

(52) U.S. Cl.
CPC ............ *F27D 25/00* (2013.01); *C01B 25/185* (2013.01); *F27B 7/28* (2013.01); *F27B 7/32* (2013.01)

(58) Field of Classification Search
CPC .... F27D 25/00; F27B 7/28; F27B 7/32; F27B 7/20; F27B 7/33; C01B 25/185; C01B 25/12
See application file for complete search history.

(56) References Cited

U.S. PATENT DOCUMENTS 1,401,212 A † 12/1921 Vermaes
1,775,313 A † 9/1930 Lellep
(Continued)

FOREIGN PATENT DOCUMENTS

CN    1054953 A    10/1991
CN    1160018 A    9/1997
(Continued)

OTHER PUBLICATIONS

Dylan Moore, Design Features of Rotary Kilns, Mar. 2, 2013, http://cementkilns.co.uk/kiln_design.html.*
(Continued)

*Primary Examiner* — Steven B McAllister
*Assistant Examiner* — Steven Anderson, II
(74) *Attorney, Agent, or Firm* — Syncoda LLC; Feng Ma; Junjie Feng

(57) ABSTRACT

A rotary kiln for reducing phosphate ore in kiln phosphoric acid process, comprising a kiln body, a kiln head box, a kiln tail box and a driving device for driving the rotation of the kiln body, wherein a fuel burner is provided at the kiln head, a feed pipe and an outlet flue connected to an external hydration tower are provided at the kiln tail box, the upper part of the kiln body is provided with no air pipe, the outlet flue is provided in the radius range of the kiln body with the axis of the rotary kiln as a center, and the fume conveying direction in the outlet flue is substantially parallel to the axis direction of the rotary kiln or has an included angle of less
(Continued)

than 45° thereto. The rotary kiln can effectively mitigate the phenomenon of ring forming in the kiln tail of the rotary kiln.

10 Claims, 5 Drawing Sheets

(51) Int. Cl.
*F27B 7/20* (2006.01)
*C01B 25/18* (2006.01)
*F27B 7/28* (2006.01)
*F27B 7/32* (2006.01)

(56) References Cited

U.S. PATENT DOCUMENTS

| | | | | |
|---|---|---|---|---|
| 1,959,086 | A * | 5/1934 | Skinner | C01B 25/20 |
| | | | | 422/618 |
| 2,075,212 | A * | 3/1937 | Levermore | C01B 25/12 |
| | | | | 422/605 |
| 2,301,855 | A * | 11/1942 | Cliffe | F27B 7/2075 |
| | | | | 102/327 |
| 2,303,843 | A † | 12/1942 | Knoblauch | |
| 2,633,347 | A * | 3/1953 | Heyman | F27B 7/28 |
| | | | | 432/103 |
| 3,182,980 | A † | 5/1965 | Helfrich | |
| 3,235,330 | A † | 2/1966 | Lapple | |
| 3,241,917 | A * | 3/1966 | Lapple | C01B 25/12 |
| | | | | 423/304 |
| 3,298,679 | A * | 1/1967 | Krautheim | F27B 7/2075 |
| | | | | 15/104.05 |
| 3,396,581 | A † | 8/1968 | Iten et al. | |
| 3,652,210 | A | 3/1972 | Smith | |
| 4,993,940 | A † | 2/1991 | McIlvaine | |
| 5,100,314 | A * | 3/1992 | Rierson | C21B 13/08 |
| | | | | 432/103 |
| 5,205,177 | A * | 4/1993 | DuBrock, Jr. | G01N 1/2258 |
| | | | | 73/863.12 |
| 7,910,080 | B2 * | 3/2011 | Megy | C01B 25/12 |
| | | | | 423/157.2 |
| 2005/0002845 | A1 | 1/2005 | Hokanson | |
| 2006/0014622 | A1* | 1/2006 | Liever | C04B 35/103 |
| | | | | 501/89 |
| 2008/0147241 | A1* | 6/2008 | Tsangaris | C03B 5/005 |
| | | | | 700/273 |

FOREIGN PATENT DOCUMENTS

| | | |
|---|---|---|
| CN | 2328962 Y | 7/1999 |
| CN | 1417114 A | 5/2003 |
| CN | 201104097 Y | 8/2008 |
| CN | 201116833 Y | 9/2008 |
| CN | 101428775 A | 5/2009 |
| CN | 201366421 Y | 12/2009 |
| CN | 102616759 A | 8/2012 |
| CN | 102765706 A | 11/2012 |
| CN | 102976322 A | 3/2013 |
| WO | 2005118468 A2 | 12/2005 |

OTHER PUBLICATIONS

ULTRAMET, Ceramic Protective Coatings, Mar. 12, 2012, http://www.ultramet.com/ceramic_protective_coatings.html.*
Levin et al., Phase Diagrams for Ceramists, Compiled at the National Bureau of Standards, Fig. 318 (The American Ceramic Society, Inc., 1964).*
Leder et al., New Process for Technical-Grade Phosphoric Acid, in Ind Eng. and Chem. Process Design and Development 24(3), pp. 688-697 (American Chemical Society 1985).*
METSO, Optimizing control system (OCS) Advanced control for Rotary Calciners, pp. 1-6 (2012).*
International Search Report in international application No. PCT/CN2013/081164, dated Mar. 13, 2014.
English Translation of the Written Opinion of the International Search Authority in international application No. PCT/CN2013/081164, dated Mar. 13, 2014.
ABB, SCK Sampling System for Dry Gas Sampling at Rotary Cement Kiln Gas Exit and Calciner Gas Exit, pp. 1-19 (2012).†
ABB, SCK Gas sampling unit for cement kiln and calciner gas exit, pp. 1-7 (2009).†
Thermal Imaging Thru-Wall System for High-Temperature Furnaces—Firesight Products—Lenox Instrument Company, Retrieved from http://www.lenoxinst.com/thermal-imaging-thru-wall-system.html (Oct. 16, 2011).†
History of Lenox Instrument Company 1980-Present, Retrieved from http://www.lenoxinst.com/About_History_06_Firesight.html (2016).†
Akwasi A. Boateng, Rotary Kilns, Transport Phenomena and Transport Processes, pp. 1-348 (Elsevier Inc. 2008).†
Hermann A. Bassert, Mechanical Developments of Sintering, inThe Iron Trade Review vol. LVII Jul. 1 to Dec. 31, 1915, p. 845 (Penton Publishing Co. 1915).†
Jacob Mu, et.al, Reduction of Phosphate Ores by Carbon: Part I. Process Variables for Design of Rotary Kiln System, in Metallurgical Transactions B, vol. 17B, pp. 861-868 (Dec. 1986).†
SICK, SCP3000 Gas Sampling System for Kiln Inlets, pp. 1-4, retrieved from https://www.sick.com/media/dox/3/13/413/Product_information_SCP3000_Gas_Sampling_System_for_Kiln_Inlets_en_IM0011413.PDF (Oct. 21, 2010).†
FLSMIDTH, Cement kiln inlet gas analysis, pp. 1-11, retrieved from http://www.flsmidth.com/~/media/Brochures/Brochures%20for%20Automation/KilnLoq_EN.ashx (2015).†
Yin Xianguo, Discussion of the Current Trial Production of CDK Kiln-Method Phosphoric Acid Technology in China, Phosphate and Compound Fertilizer, vol. 22(1), pp. 33-35 (Translation pp. 1-8) (Jan. 2007).†
Warren J. Miller, Air Force Institute of Technology School of Engineering, High Temperature Oxidation of Silica Carbide Thesis, Reproduced by National Technical Information Service, pp. 1B-55 (Sep. 22, 1972).†
Levin et al, Phase Diagrams for Ceramists, Compiled at the National Bureau of Standards, Fig. 318 (The American Ceramic Society, Inc., 1964).†
Svedala, Pyro Processing Systems and Equipment, pp. 1-19 (Date unknown, Metso acquired Svedala in 2000, likely published Sep. 1995 as indicated in bottom right corner of last page).†
Dylan Moore, Design features of rotary kilns, retrieved from http://www.cementkilns.co.uk/kiln_design.html (Aug. 26, 2014).†
Leder et al., New Process for Technical-Grade Phosphoric Acid, in Ind. Eng. and Chem. Process Design and Development 24(3), pp. 688-697 (American Chemical Society 1985).†
Perry's Chemical Engineers' Handbook, Sixth Edition, pp. 20-33 to 20-35 (McGraw-Hill 1984).†

\* cited by examiner
† cited by third party

ROTARY KILN FOR REDUCING PHOSPHATE ORE IN KILN PHOSPHORIC ACID PROCESS AND METHOD FOR SOLVING RING FORMING IN KILN TAIL IN KILN PHOSPHORIC ACID PROCESS

CROSS-REFERENCE TO RELATED APPLICATION

The application is a continuation in part of PCT/CN2013/081164 (filed on Aug. 9, 2013), which claims priority of CN. patent Application Serial No. 201310218599.1 (filed on Jun. 4, 2013) the contents of which are incorporated herein by reference in their entirety.

FIELD OF THE INVENTION

The present invention refers to a reaction device for reducing phosphate ore, particularly a rotary kiln for reducing phosphate ore.

BACKGROUND OF THE INVENTION

At present, there are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4.nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher contain of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reductant in an ore-smelting electric furnace, raising a temperature in the furnace to 1300° C. with energy of electric arc formed by electrical short-circuiting, reducing phosphor in the phosphate ore in the form of $P_4$, meanwhile converting carbonaceous solid reductant into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80° C. to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reductant (coke powder or coal powder) are co-ground so that 50%-85% of the co-ground materials passes a −325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400° C.-1500° C., pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid. The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln. However, the solid material in the kiln must bear a mechanical frictional force resulting from movement of the material.

If a strength of the material is smaller than the received mechanical frictional force, the material can be easily destroyed. A basic principle of the KPA process proposed by ORC corporation of the United States is to co-grind the phosphate ore, the silica and the carbonaceous reductant (coke powder or coal powder) so that 50%-80% of the co-ground materials passes 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reductant carbon is added to the material pellets used in the process, carbon goes through quick oxidation reaction with oxygen in air at a temperature greater than 350° C. to produce $CO_2$. If a conventional method of consolidating pellets at a high temperature (≥900° C.) at a chain grate in the metallurgical industry is employed, the reducing carbon in the pellets will be all oxidized, the pellets entering the rotary kiln will lose the reductant, carbon thermal reduction reaction of the phosphorus naturally cannot be performed, and the process fails as a result. If only the bentonite is added as a bonding agent of the pellets to perform drying and dehydration at a temperature less than 300° C., an anti-pressure strength of the pellets is only about 10 KN per ball, with a falling strength≤1 time per meter; since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900° C., since the pellets entering the kiln cannot bear the mechanical frictional force resulting from movement of material balls in the pellets, a lot of said pellets are pulverized, and thereafter the phosphate ore powder, silica powder and carbonaceous reductant forming the pellets will separate, the phosphate ore powder after pulverization causes failure of reduction of phosphorus as it cannot get in close contact with carbonaceous reductant. More seriously, once the phosphate ore powder separates from silica powder, its melting point abruptly falls below 1250° C. When such powder-like phosphate ore passes through a high-temperature reducing area (with a material layer temperature of 1300° C. or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reductant in the material balls to be partially oxidized before the material balls are heated by the gas flow heat transfer to the carbon reduction temperature of the phosphate ore so that the material balls are not sufficiently reduced due to shortage of carbonaceous reductant in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC Corporation in large-scale industrial application and practice to produce phosphoric acid.

Joseph A. Megy proposes some improved technical methods with respect to the KPA process (see US patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reductant carbon in the material balls is oxidized by $O_2$ in the kiln gas in the rotary kiln, reduce burn of the reductant carbon before the material balls reach the reduction zone of the rotary kiln and meanwhile decease generation of phosphates or metaphosphates on the surface of the material balls in the high-temperature area of the rotary kiln. In addition, according to the process, it is desired that partial petrol coke is added to the materials entering the rotary kiln so that reducing gas generated by a volatile matter in the petrol coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petrol coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially increases the production cost of the process and makes implementation of the commercialized and large-scale application of the process impossible.

However, in the course of the subsequent study, the inventors discovered a series of new technical problems. The combustion-supporting air fed into the rotary kiln contains a certain amount of water (the water fed into the rotary kiln because of air humidity), and the water reacts with $P_2O_5$ in air-flow in the rotary kiln to form metaphosphoric acid ($HPO_3$), and then metaphosphoric acid generated reacts with the dust in the kiln gas to form complicated metaphosphate, at the kiln tail of the rotary kiln, and gradually forms a kiln tail ring in the cylinder at the kiln tail of the rotary kiln (namely the ring formed in the kiln tail of the rotary kiln) and grows up constantly; after a period of working of the kiln, the grown up ring formed in the kiln tail seriously hinders the movement of pellets and makes the pellets fed into the rotary kiln to be returned out of the kiln from the kiln tail, and then the normal working of the process is disrupted and the working of the kiln must be stopped for cleaning of the kiln, and the result further reduces the operation efficiency of the rotary kiln and increases the production cost of phosphoric acid and makes it difficult for the commercial applications of the process.

Therefore, to improve the production efficiency of the current kiln phosphoric acid process, reduce the production cost and ensure the stable operation of the process, the current kiln phosphoric acid process need to be modified and improved in those skilled in the art.

SUMMARY OF THE INVENTION

The technical problem to be solved by the present invention is to overcome the serious technical defect that failure of long-term production in current kiln phosphoric acid process, and provide a rotary kiln for reducing phosphate ore in kiln phosphoric acid process with a simple structure, low investment, low cost, and an ability of mitigating the phenomenon of ring forming in the kiln tail of the rotary kiln effectively, and also provide a method for solving ring forming in kiln tail at kiln phosphoric acid process with a simple operation, low investment and good effects.

In long-term application and practice of the kiln phosphoric acid process, the forming of ring in the kiln tail of the rotary kiln is an important technical problem troubling those skilled in the art because the ring results in the failure of feeding of raw material pellets into the kiln and normal movement of the gas flow. Practice proves that if the problem of ring forming in the kiln tail is not solved, a shortened process period, decrease process efficiency, significantly increases process cost and even the failure of the process are obtained. After years of intensive research, the inventor finally identified the main reason for the formation of ring in the kiln tail. In kiln phosphoric acid process, metaphosphoric acid in the gas flow is deposited in the kiln tail and then reacts with dust in the kiln to from metaphosphates solid and then to form solid ring in the kiln tail. To solve the technical problem described above, after repeated tests, we propose the following technical solutions:

The present invention provides a rotary kiln for reducing phosphate ore in kiln phosphoric acid process, comprising a kiln body, a kiln box and a kiln tail box, at the kiln tail box is provided, an outlet flue an upper portion of the kiln body is not provided with a wind tube, the outlet flue is disposed in a way that the fume exiting the kiln at the tail of the rotary kiln does not deviate much in a movement direction upon entering the outlet flue.

The present invention also provides a method for solving ring forming in kiln tail in kiln phosphoric acid process, the rotary kiln described above is used in the kiln phosphoric acid process, and the raw material is fed into the cavity of the rotary kiln, the phosphate ore raw material in the rotary kiln is reduced by the reductant at a high temperature to generate kiln fume, an outlet flue is arranged in a way that the fume exiting the kiln at the tail of the rotary kiln does not deviate much in a movement direction upon entering the outlet flue.

LISTING OF PARTS

Figure 1:
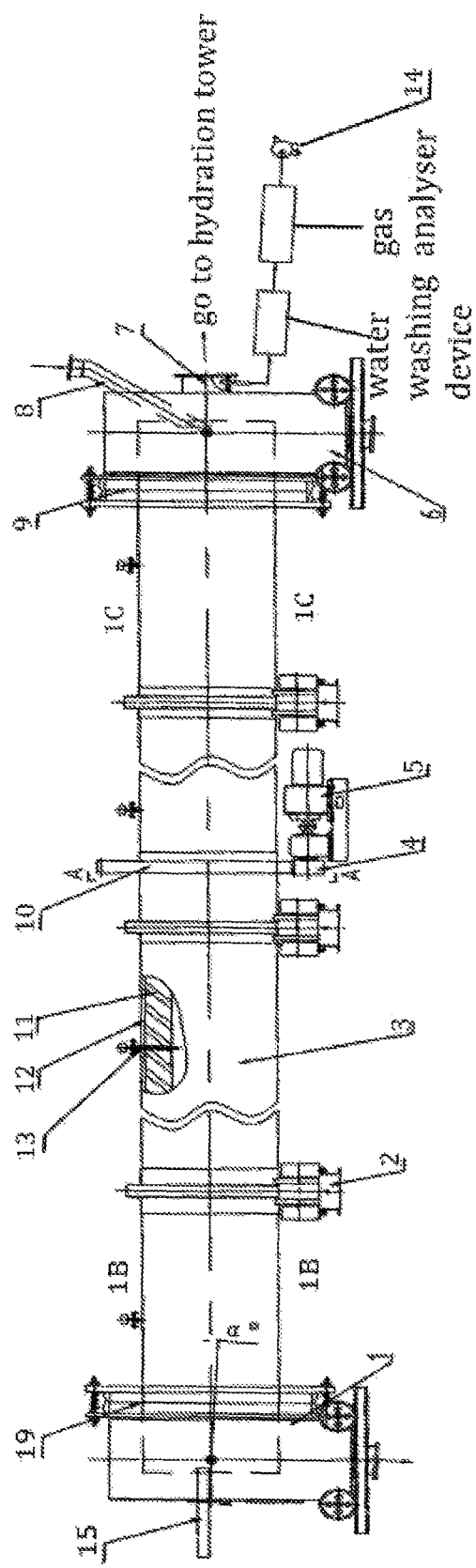
FIG. 1 is a structural schematic view of a rotary kiln according to a specific embodiment of the present invention.
Figure 2:
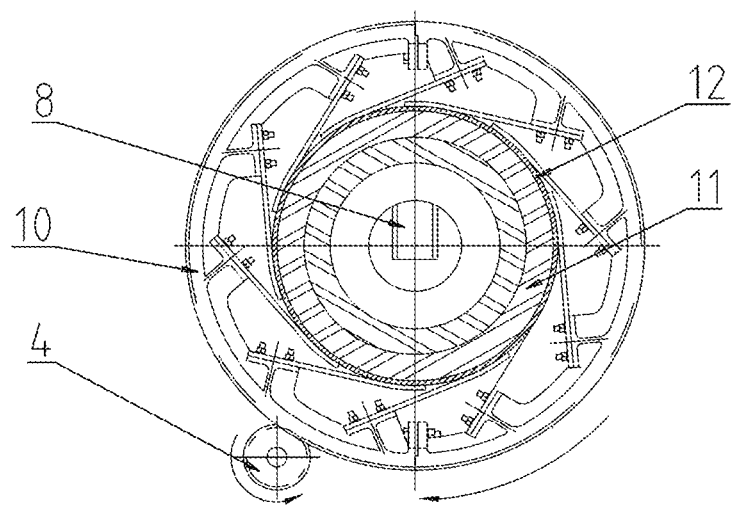
FIG. 2 is an enlarged sectional view taken along A-A in FIG. 1.

The reference number 1 denotes a kiln head box; 2 a supporting wheel device; 3 a kiln body; 4 a transmission pinion; 5 a driving device; 6 a kiln tail box; 7 an outlet flue; 8 a feed pipe; 9 a kiln tail dynamic seal; 10 a transmission gear; 11 a kiln liner; 12 a cylinder casing; 13 a thermocouple; 14 an air pump; 15 a fuel burner; 16 a silicon carbide material layer; 17 a clay material layer; 18 a high-alumina material layer; 19 a kiln head dynamic seal; 20 a scraper; 21 a platform; 22 a wheel; 23 a travel decelerating motor; 24 a machine frame; 25 a rotation shaft; 26 a supporting truss; 27 a rotary kiln door frame.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

In an embodiment of the present invention, the present invention provides a rotary kiln for reducing phosphate ore in kiln phosphoric acid process, comprising a kiln body, a kiln box and a kiln tail box, at the kiln tail box is provided an outlet flue, an upper portion of the kiln body is not provided with a wind tube, the outlet flue is disposed in a way that the fume exiting the kiln at the tail of the rotary kiln does not deviate much in a movement direction upon entering the outlet flue.

In an embodiment of the present invention, the rotary kiln further comprises a driving device for driving the kiln body to rotate.

In an embodiment of the present invention, at the kiln head of the kiln body is provided a fuel burner, at the kiln tail box are provided a feed pipe and an outlet flue connected to an external hydration tower.

In an embodiment of the present invention, the outlet flue is disposed in a scope of radius of the kiln body with an axis of the rotary kiln as a center, and a fume delivery direction in the outlet flue is substantially parallel to the axial direction of the rotary kiln or at an angle of less than 45° relative to the axial direction of the rotary kiln.

In an embodiment of the present invention, the outlet of fume exhaust pipe at the kiln tail of the rotary kiln is disposed in the same direction as the axis of the rotary kiln.

In other embodiment of the present invention, a proper deviation may be permitted to facilitate arrangement of a pipe to the hydration tower. The fume exiting the kiln at the tail of the rotary kiln does not deviate much in the movement direction upon entering the outlet flue, thereby preventing metaphosphate in the fume existing the kiln from generating centrifugal physical settlement at the tail of the rotary kiln, so that the metaphosphoric acid in the kiln gas directly enters a subsequent hydration tower along with the fume exiting the kiln and is converted to be orthophosphoric acid after meeting water. Since metaphosphoric acid settled in the rotary kiln decreases, a cycle of forming a ring at the kiln tail is prolonged and an operation efficiency of the rotary kiln is improved.

In an embodiment of the present invention, the kiln body comprises an external cylinder casing and a kiln liner disposed inside the cylinder casing, and the kiln body is divided into a reduction zone and preheating zone in a lengthwise direction of the rotary kiln, wherein the reduction zone is close to the kiln head box, the preheating zone is close to the kiln tail box.

In an embodiment of the present invention, the length of reduction zone is $1/3$ to $3/5$ of the length of the kiln body and the length of preheating zone is $2/5$ to $2/3$ of the length of the kiln body.

In an embodiment of the present invention, the kiln liner mainly comprises a refractory brick or a refractory pouring material.

In an embodiment of the present invention, the kiln liner of the pretreating zone at the kiln tail of the rotary kiln employs a bi-layered composite material structure: a portion close to the cylinder casing of the rotary kiln employs a clay material layer, and a side adjacent to interior of the rotary kiln employs a silicon carbide material layer. Since it is difficult that the metaphosphate reacts with silicon carbide material, metaphosphate deposited in the pretreating zone of the rotary kiln falls off on its own due to gravity.

In an embodiment of the present invention, the kiln liner located in the reduction zone comprises a clay material layer adjacent to the cylinder casing and a high alumina material layer adjacent to an inner cavity of the rotary kiln; the kiln liner located in the preheating zone comprises a clay material layer adjacent to the cylinder casing and a silicon carbide material layer adjacent to the inner cavity of the rotary kiln.

In an embodiment of the present invention, the clay material layer with a small thermal conduction coefficient, a high alumina material layer is highly refractory and has a relatively large thermal conduction coefficient, and the silicon carbide material layer reacts with metaphosphoric acid to a low extent and has a relatively large thermal conduction coefficient.

In an embodiment of the present invention, a kiln cleaning machine is disposed externally the kiln tail box, and a scraper is provided in the kiln-cleaning machine to progressively extend into the kiln tail box of the rotary kiln and keep scraping relative to an inner wall of the cavity.

In an embodiment of the present invention, a scraper is heat resistant and made of stainless steel.

In the present invention, made of heat-resistant stainless steel is mounted at the kiln tail box of the rotary kiln; once the kiln tail ring is formed and causes pellets to return from the kiln tail, fuel supply for heating the rotary kiln is stopped and delivery of pellets into the rotary kiln is stopped, and meanwhile, the scraper may progressively extend into the rotary kiln to cut and scrape away the kiln tail ringing by virtue of rotation of the rotary kiln itself.

In an embodiment of the present invention, an axis of the rotary kiln forms an angle of 1.7°-2.9° with a horizontal plane, and a length-diameter ratio (referring to a ratio of a rotary kiln length to an inner diameter of a steel casing of the cylinder of the rotary kiln) of the kiln body is 10-25:1, and a filling rate of kiln is 7-25%, and a rotation speed of the rotary kiln is controlled in a range of 0.6 r/min-3 r/min. A thickness of refractory material in kiln is preferably 200 mm-280 mm.

In an embodiment of the present invention, a plurality of thermocouples for monitoring an in-kiln temperature are mounted in a lengthwise direction of the kiln body of the rotary kiln, the thermocouples are coupled to a temperature control device and a temperature display device outside the rotary kiln via an electrically conductive ring or a wireless transmitting and receiving device; the kiln head of the rotary kiln is mounted with an industrial television for monitoring conditions in the rotary kiln.

In the present invention, with the thermocouples being disposed, it can be ensured that a maximum temperature of the composite pellets with a $CaO/SiO_2$ mole ratio in inner pellets of less than 0.6 does not exceed 1370° C. and a maximum temperature of the composite pellets with a $CaO/SiO_2$ mole ratio in inner pellets of greater than 6.5 does not exceed 1450° C. for a better control of the reaction condition and an ensured product quality.

In an embodiment of the present invention, an air pump for extracting air sample is mounted in the kiln tail box or the outlet flue of the rotary kiln.

In the present invention, an air pump for extracting air sample is mounted on the outlet flue at the outlet of the kiln tail box or on the kiln tail box of the rotary kiln, and the air samples collected by the air pump, after being washed with water to remove dust, are fed into a gas analyser to monitor the content of CO and $O_2$ in the fume exiting the kiln for a better control of the content range of CO and $O_2$ in the fume exiting the kiln (generally is 0-5%).

The present invention also provides a method for solving ring forming in kiln tail in kiln phosphoric acid process, the rotary kiln described above is used in the kiln phosphoric acid process, and the raw material is fed into the cavity of the rotary kiln, the phosphate ore raw material in the rotary kiln is reduced by the reductant at a high temperature to generate kiln fume, an outlet flue is arranged in a way that the fume exiting the kiln at the tail of the rotary kiln does not deviate much in a movement direction upon entering the outlet flue.

In an embodiment of the present invention, the method for solving ring forming in kiln tail in kiln phosphoric acid process comprises: the rotary kiln described above is used in the kiln phosphoric acid process, and the raw material is fed into the cavity of the rotary kiln through a feed pipe at the kiln tail of the rotary kiln, a fuel burner is ignited to heat a reduction zone in the rotary kiln to 1300° C.-1450° C., the phosphate ore raw material in the rotary kiln is reduced by the reductant at a high temperature to generate kiln fume, the outlet flue is arranged in a way that the fume exiting the kiln at the tail of the rotary kiln does not deviate much in a movement direction upon entering the outlet flue, thereby preventing metaphosphoric acid in the fume exiting the kiln from generating centrifugal physical settlement at the tail of the rotary kiln so that the metaphosphoric acid in the kiln gas directly enters a subsequent hydration tower along with the fume exiting the kiln and is converted to be orthophosphoric acid after meeting water.

In an embodiment of the present invention, the kiln liner of the pretreating zone at the kiln tail of the rotary kiln employs a bi-layered composite material structure: a portion close to the cylinder casing of the rotary kiln employs a clay material layer, and a side adjacent to interior of the rotary kiln employs a silicon carbide material layer, and thus a reduced adhesion of metaphosphate on the kiln liner in the preheating zone of rotary kiln to the kiln liner, and the resulting falling off of metaphosphate on its own can mitigate the phenomenon of ring forming in the kiln tail of the rotary kiln, a low level of reaction of silicon carbide with metaphosphoric acid can significantly reduce the adhesion of metaphosphate to the preheating zone at the kiln tail of the rotary kiln and result in the falling off of metaphosphate formed at the kiln tail of the rotary kiln on its own to further ease occurrence of ring forming at the kiln tail.

In an embodiment of the present invention, a matching kiln cleaning machine is disposed externally the kiln tail box, wherein a scraper is provided in the kiln cleaning machine to progressively extend into the kiln tail box of the rotary kiln and keep scraping relative to an inner wall of the cavity.

In an embodiment of the present invention, when the ring-forming at the tail of the rotary kiln causes material balls of the raw materials to return materials to outside the rotary kiln from the kiln tail, fuel supply for heating the rotary kiln is stopped first, meanwhile delivery of the material balls into the rotary kiln is stopped, the material balls in the rotary kiln are emptied, then the scraper in the kiln cleaning machine is made extend gradually from a rotary kiln door frame into the rotary kiln, and then the ring formed at the kiln tail are cut and scraped away by virtue of rotation of the rotary kiln itself.

In an embodiment of the present invention, an axis of the rotary kiln forms an angle in a range of 1.2°-2.9° with a horizontal plane; a length-diameter ratio of the kiln body is 10-25:1; a filling rate of the rotary kiln is 7%-25%, and a rotation speed of the rotary kiln is controlled in a range of 0.6 r/min-3 r/min; a thickness of the refractory material of the rotary kiln is 200 mm-280 mm.

EXAMPLES

A rotary kiln for reducing phosphate ore in kiln phosphoric acid process shown in FIG. 1-8 comprises a kiln body 3, a kiln head box 1, a kiln tail box 6 and a driving device 5 for driving the kiln body to rotate, the driving device 5 comprises a motor, a transmission pinion 4 connected with the motor and a transmission gear 10 meshing with the transmission pinion 4, and a supporting wheel device 2 is disposed in the middle of the kiln body 3. A kiln head dynamic seal 19 is employed between the kiln head box 1 and the kiln body 3, and a kiln tail dynamic seal 9 is employed between the kiln tail box 6 and the kiln body 3.

The kiln head of the kiln body 3 according to the present embodiment are provided with a fuel burner 15 and a high-temperature slag pellets outlet, and the kiln tail box 6 of the kiln body 3 are provided with an outlet flue 7 which is connected to an external hydration tower, and a feed pipe 8 is in communication with an inner cavity of the rotary kiln. The upper part of the kiln body 3 is not provided with a wind tube, and the outlet flue 7 is disposed on an axis of the rotary kiln, and a fume delivery direction in the outlet flue 7 is substantially parallel to the axial direction of the rotary kiln.

Figure 3:
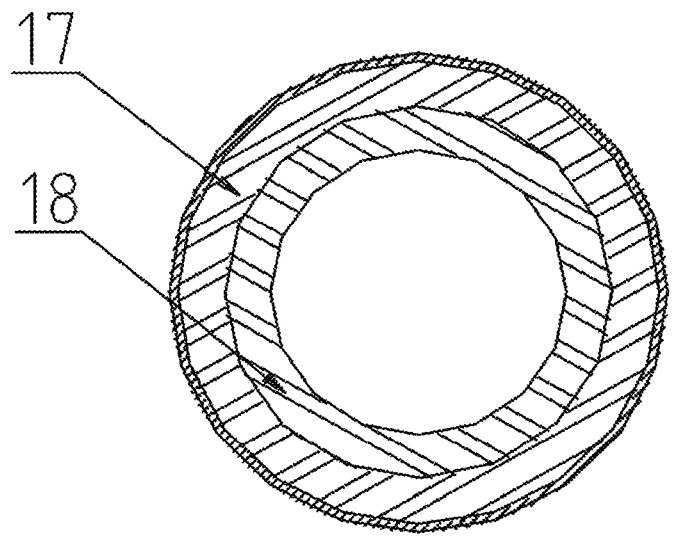
FIG. 3 is an enlarged sectional view taken along B-B in FIG. 1.
Figure 4:
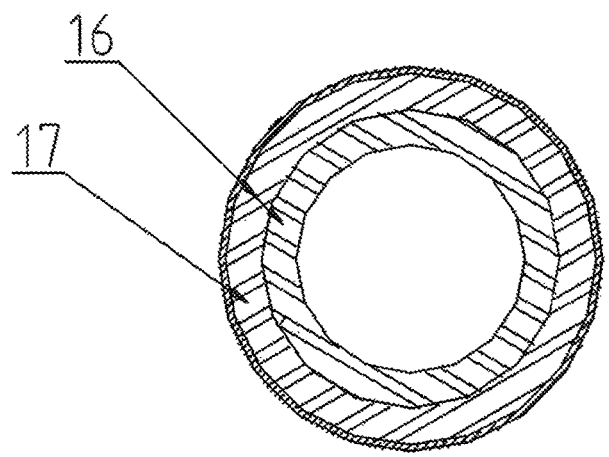
FIG. 4 is an enlarged sectional view taken along C-C in FIG. 1.

The kiln body 3 according to the present embodiment compromises an external cylinder casing 12 and a kiln liner 11 disposed inside the cylinder casing 12, and the kiln body 3 is divided into a reduction zone and preheating zone in a lengthwise direction of the rotary kiln, the reduction zone is close to the kiln head box 1 and the preheating zone is close to the kiln tail box 6, wherein the length of reduction zone is ⅓ to ⅗ (½ in the present embodiment) of the length of the kiln body and the length of preheating zone is ⅖ to ⅔ (½ in the present embodiment) of the length of the kiln body. The kiln liner 11 is mainly comprises a composite refractory pouring material (or a composite refractory brick), as shown in FIG. 3, the kiln liner 11 located in reduction zone comprises a clay material layer 17 adjacent to cylinder casing 12 and a high-aluminous material layer 17 (with an aluminum oxide content≥65%) adjacent to the inner cavity of kiln; and as shown in FIG. 4, the kiln liner 11 located in preheating zone comprises a clay material layer 17 adjacent to the cylinder casing 11 and a silicon carbide material layer 16 adjacent to the inner cavity of kiln.

Figure 5:
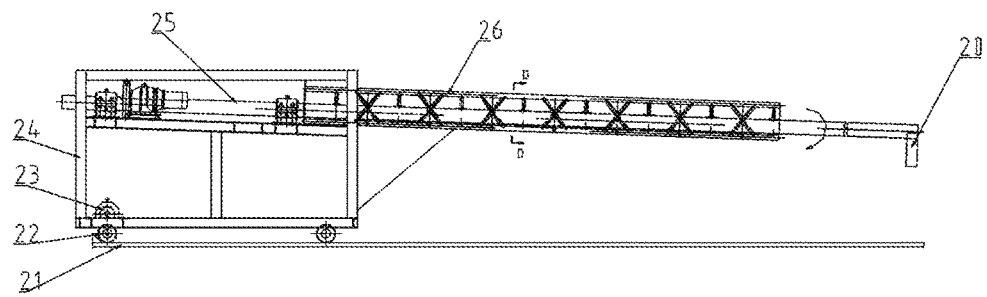
FIG. 5 is a structural schematic view of a kiln cleaning machine according to a specific embodiment of the present invention.
Figure 6:
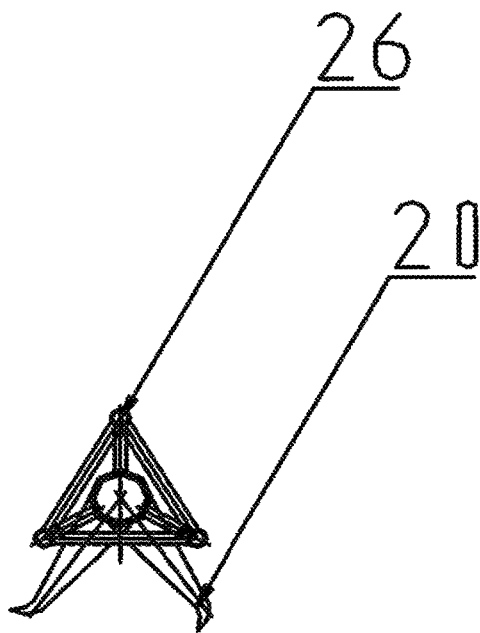
FIG. 6 is an enlarged sectional view taken along D-D of FIG. 5.
Figure 7:
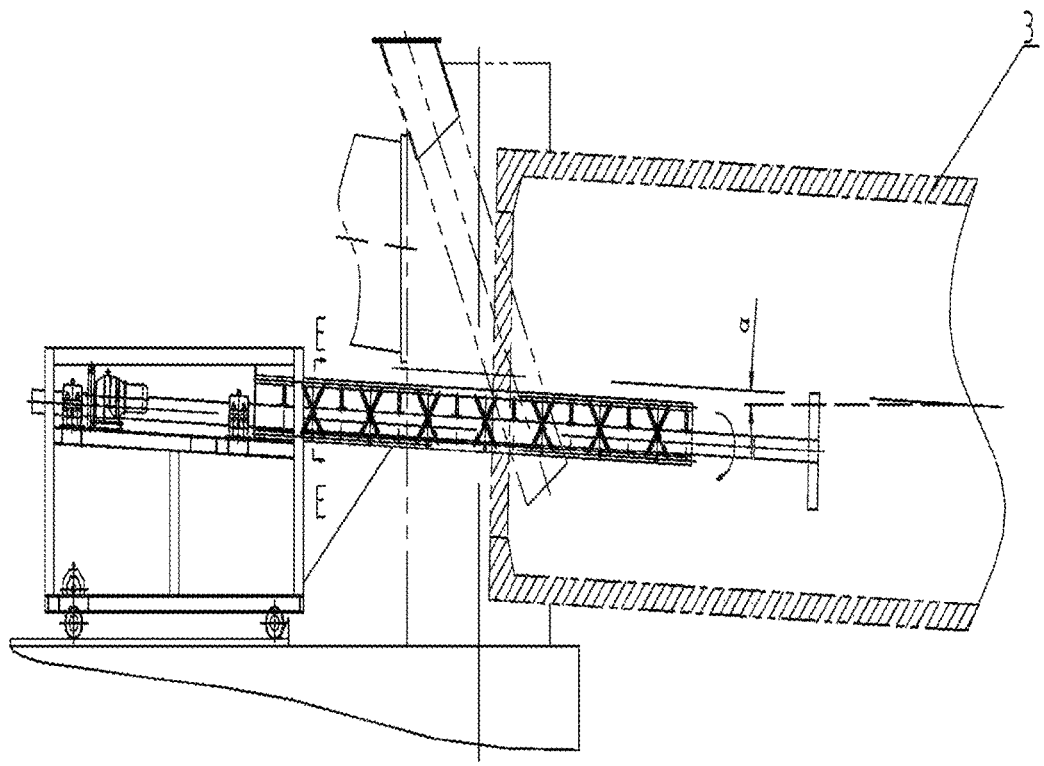
FIG. 7 is a theoretical view of the kiln cleaning machine according to the specific embodiment of the present invention upon operation.
Figure 8:
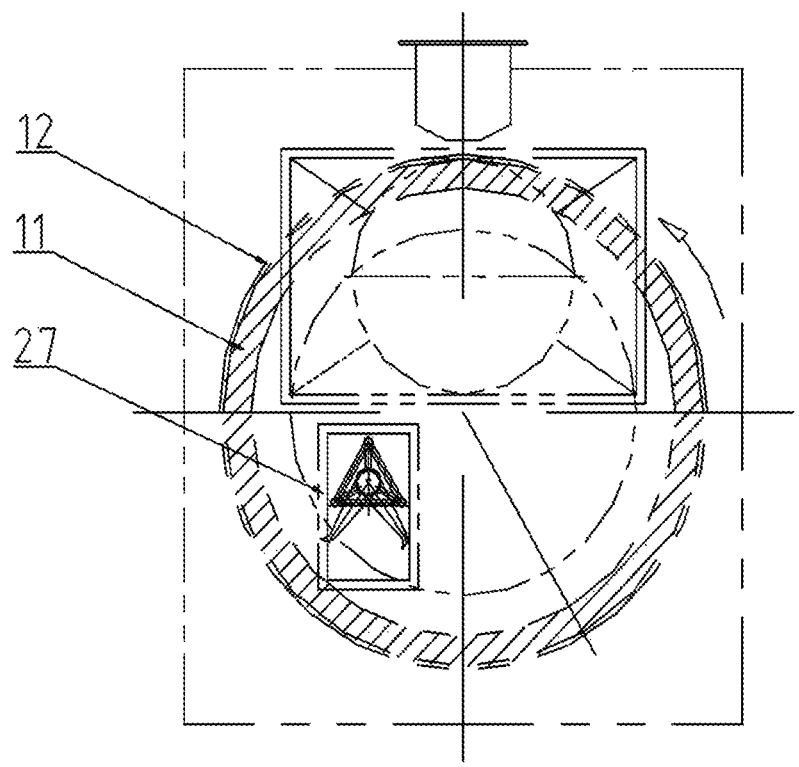
FIG. 8 is an enlarged sectional view taken along E-E.

In the present embodiment, a matching kiln cleaning machine is disposed externally the kiln tail box 6, as shown in FIG. 5 and FIG. 8, the kiln cleaning machine is placed on a platform 21, and the bottom of the kiln cleaning machine is provided with wheels 22 rolling on the platform 21, and the wheels 22 are driven by a travel decelerating motor 23, the main body of the kiln cleaning machine is a machine frame 24, a rotation shaft 25 driven by a motor is mounted in the upper part of the machine frame 24, the rotation shaft 25 extends in a substantially horizontal direction out of the machine frame 24, and a supporting truss 26 is sleeved around the extended portion, the free end of the extended part of the rotation shaft 25 is provided with a scraper 20 (which is made of heat-resistant stainless steel) which may progressively extend into the kiln tail box 6 (it is easy for the rotating scraper to extend into the kiln tail box) of the rotary kiln and keep scraping relative to the inner wall of the cavity. Once the kiln tail ring is formed and causes material balls to return from the kiln tail, fuel supply for heating the rotary kiln is stopped and delivery of material balls into the rotary kiln is stopped, and meanwhile, the scraper 20 may progressively extend into the rotary kiln to cut and scrape away the kiln tail ringing by virtue of rotation of the rotary kiln itself.

The problem of ring forming in the kiln tail of the rotary kiln can be solved by using the rotary kiln according to the present embodiment, and the specific operation is as follows: the rotary kiln described above is used in the kiln process for producing phosphoric acid, and the raw material is fed into the cavity of the rotary kiln through a feed pipe 8 at the kiln tail of the rotary kiln, and then the fuel burner 15 is ignited to heat the reduction zone in the rotary kiln to a temperature of 1300° C. to 1450° C., and the phosphate ore raw material in the rotary kiln is reduced by the reductant under a high-temperature condition to generate kiln fume, the outlet of outlet flue 7 at the kiln tail is disposed in the same direction with (namely parallel to) an axis of the rotary kiln so that the fume exiting the kiln at the tail of the rotary kiln dose not deviate much in the movement direction upon entering the outlet flue, thereby preventing metaphosphoric acid in the fume exiting the kiln from generating centrifugal physical settlement at the tail of the rotary kiln so that the metaphosphoric acid in the kiln gas directly enters a subsequent hydration tower along with the fume exiting the kiln and is converted to be orthophosphoric acid after meeting water. Furthermore, in the present embodiment, the kiln liner 11 located in the preheating zone of the rotary kiln is produced into a bi-layered composite refractory pouring material (or composite refractory brick), a portion of the kiln liner adjacent to the cylinder casing 12 of the rotary kiln employs a clay material to produce the clay material layer 17, and a portion of the kiln liner adjacent to the inner cavity of the rotary kiln employs a silicon carbide material to produce the silicon carbide material layer 16. Since it is difficult that the metaphosphate reacts with the silicon carbide material, this allows the metaphosphate deposited on the preheating zone kiln liner 11 of the rotary kiln due to reaction to less adhere to the kiln liner 11. Such kiln liner structure may further stop the metaphosphate from reacting and forming ring with the kiln liner 11, make it fall off on its own, and further ease occurrence of ring forming at the kiln tail. Furthermore, the scraper 20 made of heat-resistant stainless steel is mounted in a kiln cleaning machine disposed external of the kiln tail box 6 of the rotary kiln of the present embodiment, and the scraper 20 is a scraper that may progressively extend into the kiln tail box 6 of the rotary kiln and keep scraping relative to the inner wall of the cavity; when the ring-forming at the tail of the rotary kiln causes material balls of the raw materials to return materials to outside the rotary kiln from the kiln tail, fuel supply for heating the rotary kiln is stopped first, meanwhile delivery of the material balls into the rotary kiln is stopped, the material balls in the rotary kiln are emptied, then the scraper 20 in the kiln cleaning machine is made extend gradually from a rotary kiln door frame 27 into the rotary kiln, and then the ring formed at the kiln tail are cut and scraped away by virtue of rotation of the rotary kiln itself (see FIG. 7 and FIG. 8 for the working principle of the kiln cleaning machine). As can be seen from the above, the rotary kiln according to the present embodiment, through multiple guarantee measures and technical means, effectively eases the issue about ring-forming at the tail of the rotary kiln in the kiln process for producing phosphoric acid.

In addition, in the present embodiment, a plurality of thermocouples 13 for monitoring the in-kiln temperature are mounted in the lengthwise direction of the kiln body 3 of the rotary kiln according to the present embodiment, and the thermocouples 13 are coupled to a temperature control device and a temperature display device outside the rotary kiln via an electrically conductive ring or a wireless transmitting and receiving device. With the thermocouples 13 being disposed, it can be ensured that a temperature requirement be set for reaction wherein a maximum temperature of the composite pellets whose inner pellet material $CaO/SiO_2$ mole ratio is less than 0.6 does not exceed 1370° C., and a temperature requirement be set for reaction wherein a maximum temperature of the composite pellets whose inner pellet material $CaO/SiO_2$ mole ratio is greater than 6.5 does not exceed 1450° C. The kiln head of the rotary kiln is mounted with an industrial television for monitoring conditions in the rotary kiln.

Additionally, an air pump 14 for extracting air sample is mounted on the outlet flue 7 at the outlet of the kiln tail box 6 of the rotary kiln according to the present embodiment. The air sample collected by the air pump 14, after being washed with water and dedusted, is fed into a CO and $O_2$ gas analyzing instrument to monitor CO and $O_2$ content of the outlet fume of the rotary kiln so as to better control a range of content of CO and $O_2$ of the fume existing the kiln (generally 0-5%).

In the present embodiment, an axis of the rotary kiln forms an angle α in a range of 1.2°-2.9° with a horizontal plane (2.3° in the present embodiment), a length-diameter ratio of the kiln body 3 is 10-25:1 (15:1 in the present embodiment), a filling rate of the rotary kiln is 7%-25% (13% in the present embodiment), and a rotation speed of the rotary kiln is controlled in a range of 0.6 r/min-3 r/min (1 r/min in the present embodiment). A thickness of the refractory material of the rotary kiln is preferably 200 mm-280 mm (220 mm in the present embodiment).

The invention claimed is:

1. A rotary kiln for reducing phosphate ore in a kiln phosphoric acid process, comprising a kiln body, a kiln head box and a kiln tail box, at the kiln tail box is provided an outlet flue, an upper portion of the kiln body is not provided with a wind tube, wherein the outlet flue is provided in an radius range of the kiln body with an axis of the rotary kiln as a center, and a fume conveying direction in the outlet flue has an included angle of less than 45° with an axis direction of the rotary kiln and is not parallel thereto, wherein the kiln body comprises an external cylinder casing and a kiln liner disposed inside the cylinder casing, and the kiln body is divided into a reduction zone and a preheating zone in an axial direction of the kiln body, and the reduction zone is located near the kiln head box and the preheating zone is located near the kiln tail box, Wherein the kiln liner employs a bi-layered composite material structure, wherein the kiln liner located in the reduction zone comprises a clay material layer adjacent and radially inward from the cylinder casing and a high-aluminous material layer adjacent and radially inward from the clay material and the inner cavity of the kiln body is adjacent and radially inward from the high-aluminous material layer; and the kiln liner located in the preheating zone comprises a clay material layer adjacent and radially inward from the cylinder casing and a silicon carbide material layer adjacent and radially inward from the clay material and the inner cavity of the kiln body is adjacent and radially inward from the silicon carbide material layer.

2. A rotary kiln for reducing phosphate ore in a kiln phosphoric acid process according to claim 1, wherein the rotary kiln further comprising a driving device for driving the rotation of the kiln body.

3. A rotary kiln for reducing phosphate ore in a kiln phosphoric acid process according to claim 2, wherein at the kiln head of the kiln body is provided a fuel burner, at the kiln tail box are provided a feed pipe and an outlet flue connected to an external hydration tower.

4. A rotary kiln for reducing phosphate ore in a kiln phosphoric acid process according to claim 1, wherein the length of reduction zone is 1/3 to 3/5 of the length of the kiln body and the length of the preheating zone is 2/5 to 2/3 of the length of the kiln body.

5. A rotary kiln for reducing phosphate ore in a kiln phosphoric acid process according to claim 4, wherein the kiln liner mainly comprises a refractory brick or a castable refractory material.

6. A method for solving ring forming in a kiln tail in a kiln phosphoric acid process, wherein the rotary kiln described according to claim 1 is used in the kiln phosphoric acid process, and a phosphate ore raw material in a form of balls is fed into the cavity of the rotary kiln, the phosphate ore raw material in the rotary kiln is reduced by the reductant at a high temperature to generate kiln fume, wherein the outlet flue is provided in an radius range of the kiln body with an axis of the rotary kiln as a center, and a fume conveying direction in the outlet flue has an included angle of less than 45° with an axis direction of the rotary kiln and is not parallel thereto, thereby preventing metaphosphoric acid in a fume exiting the rotary kiln from generating centrifugal physical settlement at a tail of the rotary kiln so that the metaphosphoric acid in a kiln gas directly enters a subsequent hydration tower along with the fume exiting the kiln and is converted to orthophosphoric acid after meeting water, wherein the kiln body comprises an external cylinder casing and a kiln liner disposed inside the cylinder casing, and the kiln body is divided into a reduction zone and a preheating zone in an axial direction of the rotary kiln, and the reduction zone is located near the kiln head box and the preheating zone is located near the kiln tail box, Wherein the kiln liner employs a bi-layered composite material structure, wherein the kiln liner located in the reduction zone comprises a clay material layer adjacent and radially inward from the cylinder casing and a high-aluminous material layer adjacent and radially inward from the clay material and the inner cavity of the kiln body is adjacent and radially inward from the high-aluminous material layer; and the kiln liner located in the preheating zone comprises a clay material layer adjacent and radially inward from the cylinder casing and a silicon carbide material layer adjacent and radially inward from the clay material and the inner cavity of the kiln body is adjacent and radially inward from the silicon carbide material layer.

7. The method according to claim 6, wherein the phosphate ore raw material is fed into the cavity of the rotary kiln through a feed pipe at the kiln tail of the rotary kiln, a fuel burner is ignited to heat a reduction zone in the rotary kiln to 1300-1450° C., the phosphate ore raw material in the rotary kiln is reduced by the reductant at a high temperature to generate a kiln fume.

8. The method according to claim 6, wherein a matching kiln cleaning machine is disposed outside the kiln tail box, a scraper for progressively extending into the kiln tail box and capable of scraping on an inner wall of the inner cavity is provided in the kiln cleaning machine.

9. The method according to claim 8, wherein when the ring-forming at the tail of the rotary kiln causes the phosphate ore raw material in a form of balls to return to outside the rotary kiln from the kiln tail, fuel supply for heating the rotary kiln is stopped, delivery of the phosphate ore raw material in a form of balls into the rotary kiln is stopped, the phosphate ore raw material in a form of balls in the rotary kiln are emptied, then the scraper in the kiln cleaning machine is extended gradually from a rotary kiln door frame into the rotary kiln, and then the ring formed at the kiln tail are cut and scraped away by virtue of rotation of the rotary kiln itself.

10. The method according to claim 6, wherein the axis of the rotary kiln forms an angle in a range of 1.2°-2.9° with a horizontal plane; a length-diameter ratio of the kiln body is 10-25:1; a ratio of a volume of the phosphate ore filled in the rotary kiln to a volume of the rotary kiln is 7%-25%, and a rotation speed of the rotary kiln is controlled in a range of 0.6 r/min-3 r/min; a thickness of the refractory material of the rotary kiln is 200 mm-280 mm.

\* \* \* \* \*